Nov. 10, 1953     J. R. URSCHEL     2,658,542
SECTIONALIZING MACHINE FOR EXTRUDABLE CUTTABLE MATERIAL
Filed Nov. 1, 1950     2 Sheets-Sheet 1

INVENTOR.
Joe R. Urschel
BY
Atty.

Nov. 10, 1953 — J. R. URSCHEL — 2,658,542
SECTIONALIZING MACHINE FOR EXTRUDABLE CUTTABLE MATERIAL
Filed Nov. 1, 1950 — 2 Sheets-Sheet 2

INVENTOR.
Joe R. Urschel

Patented Nov. 10, 1953

2,658,542

UNITED STATES PATENT OFFICE 2,658,542

SECTIONALIZING MACHINE FOR EXTRUDABLE CUTTABLE MATERIAL

Joe R. Urschel, Valparaiso, Ind.

Application November 1, 1950, Serial No. 193,404

2 Claims. (Cl. 146—192)

This invention concerns a machine for cutting extrudable material such as meat into small fragments which, when massed together, are useable in the same manner as meat ground by an ordinary meat grinder of the character having a perforated plate through which the meat is forced by an auger to emerge in tentacle-like formations which are cut in short lengths by a shearing knife swept over the exterior surface of the perforated plate. More particularly, the invention concerns a machine generally of the type disclosed by United States Patent No. 2,520,982.

The machine disclosed in said patent comprises a receptacle having a cylindrical wall about which the extrudable substance is revolved while pressing radially outwardly against such wall. This wall has a side opening which is blocked by a metering structure disposed exteriorly of such wall and having a surface containing a plurality of small pockets into which surface portions of the revolved substance are projected or extruded upon arriving in registry with such pockets. Driving means is provided for the metering structure for causing its recessed surface to move across the side wall opening in the same direction and at the same speed as the extrudable substance whereby a shearing knife arranged along an edge of the opening and contiguously with the surface of the metering structure shears the extruded parts of the material from the main body thereof. The sheared extruded parts are discharged centrifugally from the metering structure recesses after passing the knife whereas the remaining portion of the main body of the material continues past the opening and around the cylindrical wall for repeated presentation to the metering structure and successive extrusion of surface parts and the shearing away thereof.

An important object of this invention is modifying the disposition of an approached section of the chamber wall over which the substance approaches the opening whereby the body of extrudable material is caused to exert a greater force upon the extruded parts to force them to greater depth in the recesses of the metering or extrusion-receiving structure.

A further object of the invention is the provision in the extrusion-receiving structure of vent means for the material-receiving pockets therein to improve the receptivity of extruded material parts by these recesses and thus complement the modified side wall approach section for increasing the quantity of substance extruded into the pockets and consequently the speed with which the material can be processed by the machine.

These and other objects inherent in and encompassed by the invention will become apparent from the ensuing description, the appended claims, and the annexed drawings, wherein:

Figure 1:
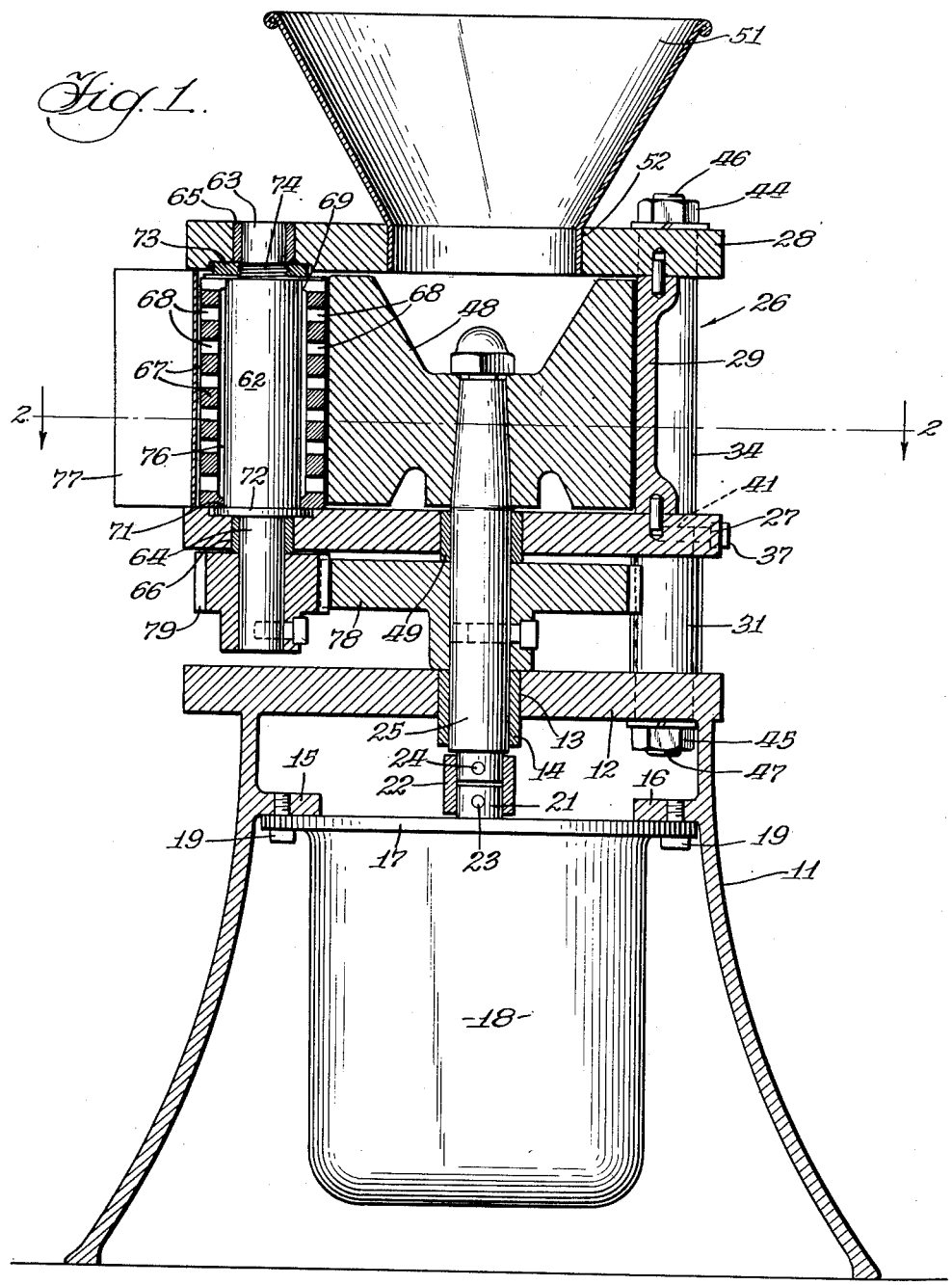
Fig. 1 is a vertical sectional view through a preferred embodiment of the invention and taken substantially at the plane indicated by the line 1—1 in Fig. 2.

With continued reference to the drawings, the machine can be seen to comprise a hollow base 11 having a flat top 12 containing an opening 13 for a bearing sleeve 14. An examination of Figs. 1 and 2 will reveal that the base 11 is somewhat bell-shaped and in Fig. 1 diametrically opposite apertured studs 15 and 16 upon the inner periphery of the base are shown for the attachment of a flange 17 of an electric motor 18 thereto by means of cap screws 19. An armature shaft 21 of this motor is drivingly coupled by a sleeve 22 and pins 23 and 24 to an impeller drive shaft 25 journalled in the bearing sleeve 14.

A receptacle 26 having a flat bottom plate 27, a flat upper plate 28 and a cylindrical wall 29 interposed between such plates is mounted upon the top 12 of the base 11 by means of spacer sleeves 31, 32 and 33 projecting upwardly from the top 12 and tension members 34, 35 and 36 projecting upwardly through the base plate 12, said sleeves and the plates 27 and 28. Cap screws 37, 38 and 39 extend inwardly through the edge of the plate 27 into threaded bores 41, 42 and 43 in the bolts 34, 35 and 36 for maintaining said plate against the upper ends of the sleeves 31, 32 and 33. Nuts 44 and 45 respectively upon reduced threaded end portions 46 and 47 of the tension members 34, 35 and 36 are for holding the chamber in assembly and maintaining it mounted upon the base. An impeller 48 is constrained for rotation in the direction of the arrow, Fig. 2, with the upper end of the impeller shaft 25 which extends into the chamber 26. This shaft extends through and is journalled in a bearing sleeve 49 in the chamber bottom plate 27. A hopper 51 facilitates feeding material to be operated upon by the machine into the chamber through an opening 52 in the top plate 28.

A side wall opening 53 in the chamber 26 is bordered on one edge by a vertical cutting edge 54 of a knife 55. A section 56 of the knife receding from the edge 54 is formed with a curvature substantially identical with that of the cylindrical inner periphery 57 of the wall 29. An approach section 58 of the wall 29 between vertical line *a* and the vertical approach edge *b* of the opening 53 extends substantially tangentially to the cylindrical periphery 57 at the line *a* instead of continuing with the curvature of such wall along a dot-dash line *c*, Fig. 2.

Figure 2:
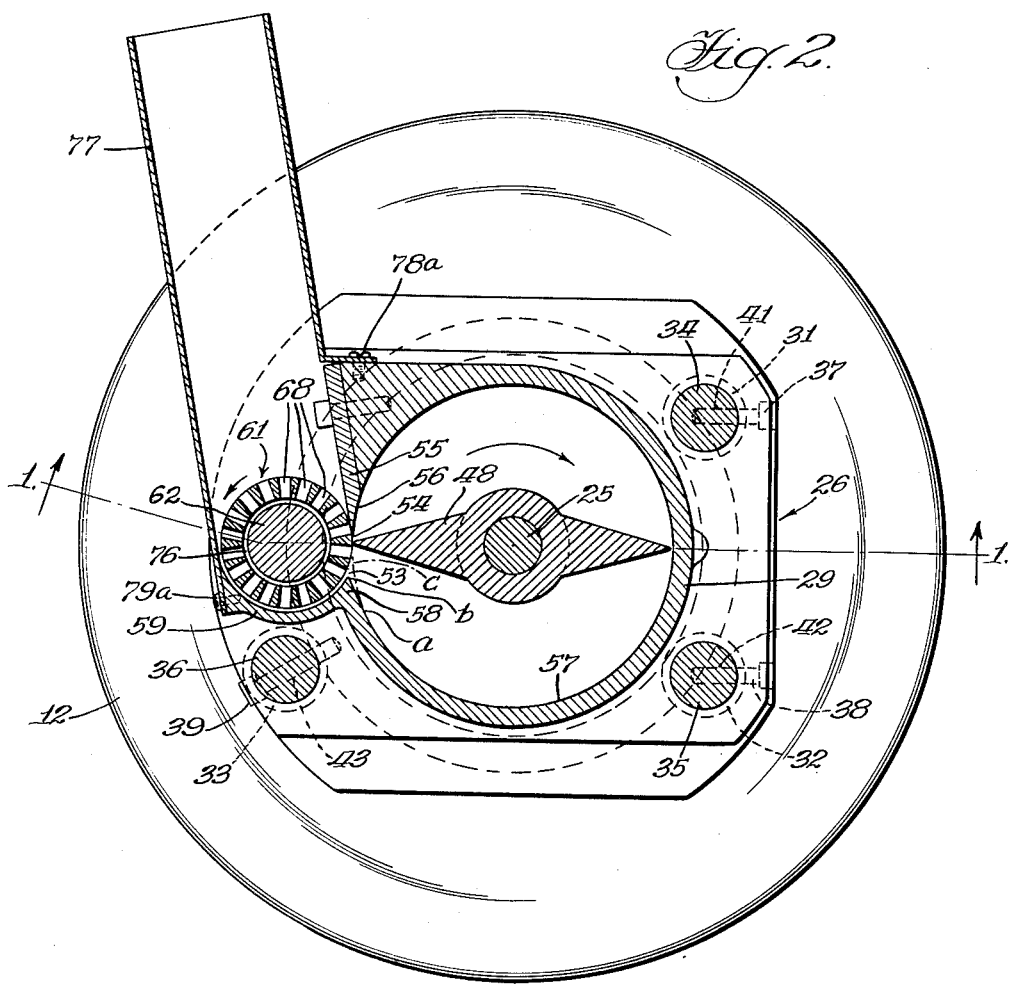
Fig. 2 is a horizontal sectional view taken substantially at the plane indicated by the line 2—2 in Fig. 1.
Figure 3:
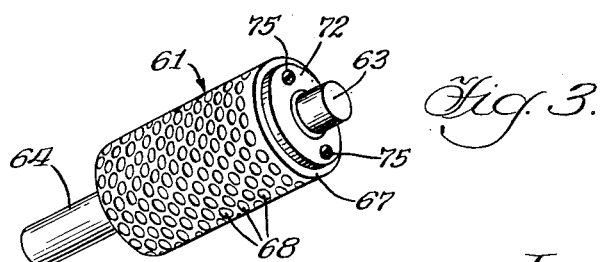
Fig. 3 is a perspective view of a metering or extrusion-receiving structure constituting an element of the machine.

A curved wall 59, Fig. 2, projects radially outwardly from the approach section 58 of the chamber wall and the inner curved surface of the wall 50 is arranged concentrically with a cylindrical extrusion-receiving structure 61. Cylindrical structure 61 comprises a shaft-like core 62 having an upper reduced spindle portion 63 and a lower spindle portion 64 respectively journalled in bearing sleeves 65 and 66 in the upper and lower plates of the chamber 26. A perforated sleeve 67 containing a plurality of holes 68 has internal flanges 69 and 71 at its ends to serve as mounting means for the sleeve on the core 62 and to maintain the inner periphery of such sleeves in slightly radially-spaced relation with respect to the core. Endwise movement of the sleeve on the core is prevented by a plate 72 abutting the lower end of such core 62 and a plate 73 mounted on a threaded portion 74 of the spindle 63 at the opposite end of such core. Machine screws 75, Fig. 3, hold the plate 72 in assembly with the core 62.

The holes 68 in the extrusion-receiving structure 61 form pockets for receiving material extruded thereinto through the chamber side wall opening 53, and the space 76 between the core 62 and the inner periphery of the sleeve 67 provides vent means for these pockets to facilitate entry of the extruded material into the pockets radially inwardly of the rotatable structure.

A spout 77 secured to the chamber wall 29 and to the curved wall 59 by screws 78a and 79a is for guiding extruded particles formed by the machine when these particles are discharged centrifugally from the pockets of the rotatable structure 61. Gears 78 and 79 respectively constrained for rotation with the shaft 25 and the spindle 64 cause the extrusion-receiving structure 61 to rotate synchronously with the impeller 48. In Fig. 1 it can be seen that the pitch line of the gear 78 is formed at a radius corresponding to the radius of the cylindrical inner periphery of the chamber wall 29 and that the pitch line of the gear 79 is substantially of the same radius as the outer periphery of the perforated sleeve 67. Consequently these gears will cause the outer periphery of the extrusion-receiving structure 61 to move across the opening 53 of chamber 26 at the same speed as the speed of that portion of extrudable material in the chamber across such opening.

*Operation of the machine*

When the machine is set in operation by energization of the electric motor 18 the impeller 48 will rotate in the direction of the arrow associated therewith in Fig. 2 while the extrusion-receiving structure 61 will rotate in the opposite direction as indicated by the arrow adjacent thereto, also in Fig. 2. Extrudable material such as meat fed into the chamber 26 through the hopper 51 will be caused to slide about the cylindrical periphery 57 at the same curvilinear speed as the outer periphery of the extrusion-receiving structure 61. Surface parts of the extrudable material arriving in registry with the opening 53 which is blocked by the structure 61 will be forced into the pockets 68 then registering with such opening and as the revolved material in the chamber 26 passes the knife edge 54 and as the material parts extruded into the pockets 68 simultaneously pass such knife edge these parts will be severed from the main body of the material which continues cyclically about the chamber for repeated presentation of a surface portion thereof to the opening and extrusion of parts thereof into the pockets 68. Parts severed by the knife edge 54 are thrown centrifugally from the pockets into the chute 77 from which they are discharged into a suitable receptacle, not shown.

An improvement in the operation of this machine relatively to that disclosed in my Patent No. 2,520,982 is attained by disposing the approach surface section a—b of the approach wall portion 58 radially outwardly of the chamber wall 29 so that the portion of the extrudable material sliding over this approach surface a—b will be caused to develop momentum for increasing the force with which parts of this material are urged into the registering pockets 68. This additional force attained by momentum of the extrudable material is complemented by the vent means 76 in the extrusion-receiving structure which prevents trapping of air in the pockets which would tend to oppose entry of the extruded parts into such pockets.

Having thus described a preferred single embodiment of the invention with the view of clearly and concisely illustrating the same, I claim:

1. A sectionalizing machine for extrudable cuttable material, comprising a receptacle for such material, said receptacle having a substantially cylindrical wall, means for revolving the receptacle-contained material to cause centrifugal force thereof against said wall, said wall containing an opening having an approach edge upon an approach section of said wall over which the revolved material moves as it approaches the opening, an extrusion-receiving structure disposed exteriorly of the receptacle in blocking relation with said opening, said structure having a plurality of material-receiving pockets into which respective parts of a portion of the material in registry with said opening are extrudable by said centrifugal force, said structure being operable to move the material-receiving pockets across said opening in the direction of movement of said registered material portion thereacross, means for operating said structure to move the pockets across the opening at substantially the same speed as said registered material portion, means for severing the extruded material parts from the unextruded part of said material portion, said approach section of the cylindrical wall being disposed tangentially with respect to the cylindrical periphery of such wall and extending outwardly to said approach edge of the opening to accommodate radial outward movement of the revolved material portion for pressing said parts into the pockets.

2. For use in a machine for sectionalizing extrudable cuttable material, an extrusion-receiving structure comprising a rotatable core having an outer periphery disposed coaxially with the rotational axis of such core, a tubular element embracing said core and having an inner periphery in opposed relation with said outer periphery of the core, said tubular element having a cylindrical outer periphery and extruded-material-receiving pockets communicating between the inner and outer peripheries of the tubular element, and at least portions of said opposed peripheries being spaced apart to provide vent means for said pockets.

JOE R. URSCHEL.

References Cited in the file of this patent

UNITED STATES PATENTS

| Number | Name | Date |
|---|---|---|
| 492,206 | Hunter et al. | Feb. 21, 1893 |
| 2,520,982 | Urschel | Sept. 5, 1950 |